United States Patent [19]
Cessat

[11] Patent Number: 5,670,960
[45] Date of Patent: Sep. 23, 1997

[54] DEVICE FOR THE DETECTION AND LOCATION OF OBJECTS ON THE GROUND

[75] Inventor: Pascal Cessat, Chaville, France

[73] Assignee: Dassault Electronique, Saint Cloud, France

[21] Appl. No.: 566,746

[22] Filed: Dec. 4, 1995

[30] Foreign Application Priority Data

Dec. 7, 1994 [FR] France .................. 94 14721

[51] Int. Cl.$^6$ .................. G01S 13/90
[52] U.S. Cl. .................. 342/25
[58] Field of Search .................. 342/25, 158, 107, 342/27, 118, 146, 104

[56] References Cited

U.S. PATENT DOCUMENTS 5,017,922   5/1991   Klausing et al. .................. 342/25

FOREIGN PATENT DOCUMENTS

4304027A1   8/1994   Germany .

OTHER PUBLICATIONS

Y. Yamaguchi et al. "Detection of Ojbects by Synthetic Aperture FM–CW Radar"—Electronics & Communications in Japan, Part I: Communications, vol. 75, No. 3, Mar. 1992, pp. 85–93.

Primary Examiner—Daniel T. Pihulic
Attorney, Agent, or Firm—Keck, Mahin & Cate

[57] ABSTRACT

The device for the detection and location of objects on the ground in a delimited zone comprises (i) a radar transmitter/receiver provided with at least one antenna generating a radiating beam displaced parallel to itself over a path that is substantially transverse with respect to its direction round a stationary position relative to the ground, and (ii) synthetic aperture radar processing means processing the output signal of the radar receiver relating to the return of said beam over said zone in accordance with the antenna movement, so as to detect and locate the objects on the ground in the said delimited zone.

12 Claims, 2 Drawing Sheets

DEVICE FOR THE DETECTION AND LOCATION OF OBJECTS ON THE GROUND

FIELD OF THE INVENTION

The invention relates to the field of the detection and location of objects on the ground.

It finds a special application in the detection and location of traffic jams where the motor vehicles are substantially immobile in one or several lanes of a highway or of an intersection.

PRIOR ART

At present, one can use cameras, operating in the visible or infrared frequency range, with a range of vision of approximately 250 meters. However, these cameras are unavailable in the case of bad weather, which is the condition when the probability of mishaps or traffic jams is greatest.

Recourse to radar has so far been dismissed for reasons which will be set out below.

In resuming the analysis of the problem, that is to say, to provide a new device, for the detection and location of objects on the ground, which is easy to operate, is simple and is relatively inexpensive, while remaining capable of operating in the case of bad weather, Applicant has noted that one particular solution based on radar could nevertheless be satisfactory.

SUMMARY OF THE INVENTION

The proposed device comprises a radar transmitter/receiver provided with at least one antenna capable of generating a radiating beam displaced parallel to itself over a path that is substantially transverse relative to its direction round a stationary position relative to the ground, and synthetic aperture radar processing means capable of processing the output signal of the radar receiver relating to the return of the said beam over the said zone in accordance with the movement of the antenna, so as to detect and locate the objects on the ground in the said delimited zone.

BRIEF DESCRIPTION OF THE DRAWINGS

Other objects and advantages of the invention will become apparent in the light of the detailed description and of the drawing wherein.

DETAILED DESCRIPTION OF THE PREFERRED EMBODIMENTS

Figure 1:
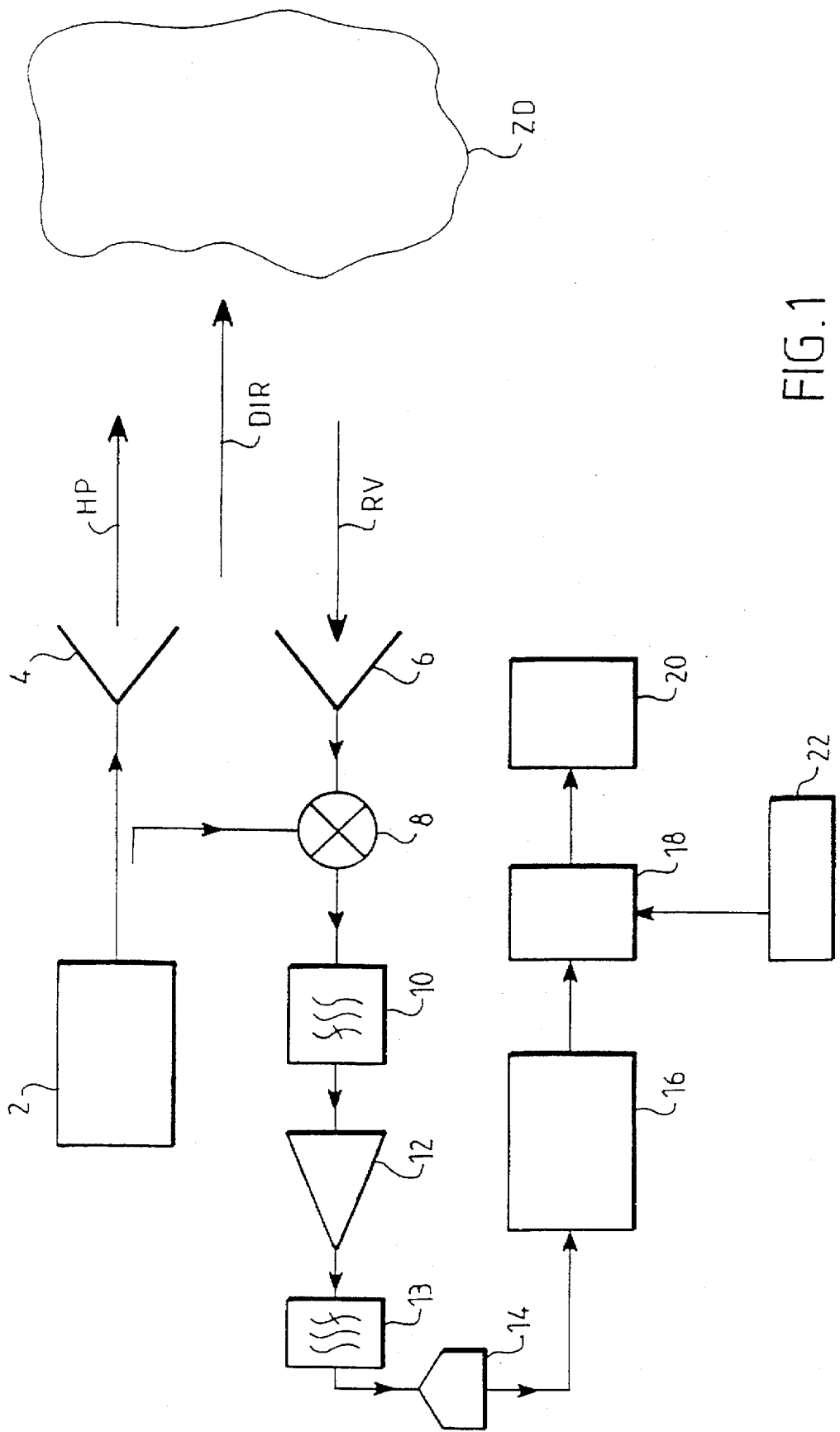
FIG. 1 is a schematic representation of the essential means of a device, for the detection and location of objects on the ground, in accordance with the invention.

We shall at first return to the problem stated above.

To replace the known cameras, there may be considered the use of a radar system, which is deemed to be less sensitive to atmospheric disturbances.

To be operational, the system would have to allow the indication of the lane of the highway in which the traffic is disturbed. The typical width of such a lane is 3.5 meters. The resolution of the radar must be better, for example, 2.5 meters, for a range equal to or better than that of the conventional cameras, which may be fixed at 250 meters.

Moreover, the order of magnitude of the angular resolution of a radar compatible with this application is approximately half a degree.

A radar is then considered which operates in the millimeter wavelength band, for example 94 GHz, whose antenna measures approximately 40 cm for an angular resolution of half a degree. But to dispose of the problem of sensitivity to the weather it is necessary to achieve great fineness in the resolution cell of the radar (i.e. the product of:- bearing aperture of the beam x elevation angle aperture of the beam x distance resolution). Because of the extent of the zone to be covered, it is then necessary to provide scanning in terms of both the elevation angle and the bearing, which leads to a radar system that is too complex and expensive for the object intended.

It is also known that radars which work at centimeter wavelength operate well in difficult meterological conditions (they have less sensitivity to atmospheric retrodiffusion). They therefore allow an elevation angle aperture which allows the whole zone to be surveyed to be irradiated. Thus only scanning with respect to the bearing angle would be necessary. But to keep the desired resolution, the necessary antenna length is greater in proportion to the ratio of the wavelengths. There then arises the problem of the minimum distance at which it may be considered that the antenna is operating in a remote field. For example, for a radar wavelength of 3.3 cm, the length of the antenna equals approximately 4 meters and the minimum distance for operating in a distant field is 1000 m. This latter distance is far greater than that at which one wishes to obtain the half-degree resolution in the intended application, hence it is impossible to utilize this class of radars.

Radars are, moreover, known which are called "synthetic aperture radars" (SAR) which are usually used on a distant moving carrier such as an aircraft or satellite. These radars attain a very high angular resolution (for fixed points) by storing and by integrating the returning signals during their displacement, after correction of the effect of the movement of the moving carrier. To allow them to be used, it is first of all necessary to know very well the movement of the moving carrier and, above all, to undertake processing whose complexity depends in particular on the nature of the path of the carrier and on the time during which it is desired to effect the integration; the resolution finally obtained depends in turn on these parameters .

It would, therefore, be theoretically possible to use such a radar for surveying road traffic but, due to the complexity and the cost of such a radar, and above all the cost of operating the carrier, the expert has so far not thought of using it in this application.

On the other hand, Applicant has observed that if the displacement of the radar beam obeys a simple rule, such as a displacement parallel to itself over a path that is, in essence, transverse relative to its direction round a stationary position relative to the ground and close to the zone to be observed, the radar used has lower performance requirements in terms of short-term stability, analysis time and output power, which opens up certain possibilities. Moreover, Applicant has observed that this rule can be obtained by relatively simple and inexpensive mechanical and/or electronic means which can be placed into operation close to the observed zone, which facilitates obtaining an adequate resolution, and further contributes towards reducing the costs of operating the device in accordance with the invention.

In FIG. 1 there is shown a device, for the detection and location of objects on the ground, which device is placed on a platform that will be described in greater detail below. The device comprises first of all a radar transmitter/receiver set.

The transmitter here comprises a generator set 2 of the FM/CW type (a frequency-modulated continuous wave, for example, along a periodic ramp) which provides the signal HP at a chosen transmission frequency, typically of a few GHz, for a ramp period of the order of 140 μs. The transmission signal HP is radiated by an antenna 4 dedicated to the transmission and which is directed along an appropriate direction DIR towards the zone ZD to be observed.

The receiver here comprises an antenna 6 dedicated to receiving returned signals RV (also called radar return signals). The antenna 6 is directed along the direction DIR. A mixer 8 mixes the returned signals RV and the transmission signal HP (homodyne mixing). The receiving chain then comprises a high pass-type filter stage 10 for rejecting the continuous component of the signal coming from the homodyne mixer, an amplifier stage 12 followed by a low pass filter 13 which limits the range of the observed distance, and finally an analog/digital conversion stage 14.

It should be observed that other types of transmission, for example with pulses, may also be suitable. Instead of separate transmission and receiving antennas, it is also possible to use a single antenna and a duplexer.

The discussion that follows relates to the synthetic aperture radar processing here obtained by an SAR processing unit 16.

When the movement of the antenna relative to the ground (or relative to another spatial and temporal reference mark) is known, it becomes possible to correct the sequence of the output signals of the converter 14 so as to retain only the contribution of those points which are substantially fixed relative to the ground (or other reference mark).

These points thus retained are advantageously used to produce an image which is displayed on an image generator 20.

It should be observed that if the displacement of the radar beam obeys a simple rule, such as a displacement parallel to itself over a path that is essentially transverse with respect to its direction round a position which is stationary relative to the ground, the SAR processing can be considerably simplified.

For improving the detection and location of objects on the ground, each complete video information image coming from the output of the processing means SAR is advantageously compared, in a correlator 18, with a representation of the observed zone contained in a memory 22. This correlation makes it possible to distinguish useful objects as compared with the background noise produced by passive elements of the observed zone.

In the application of detecting substantially immobile motor vehicles in the lane of a motorway, the resolution of the radar is two meters with a range of the order of 300 meters (that is to say, an angular resolution of the order of 0.5°).

Figure 2:
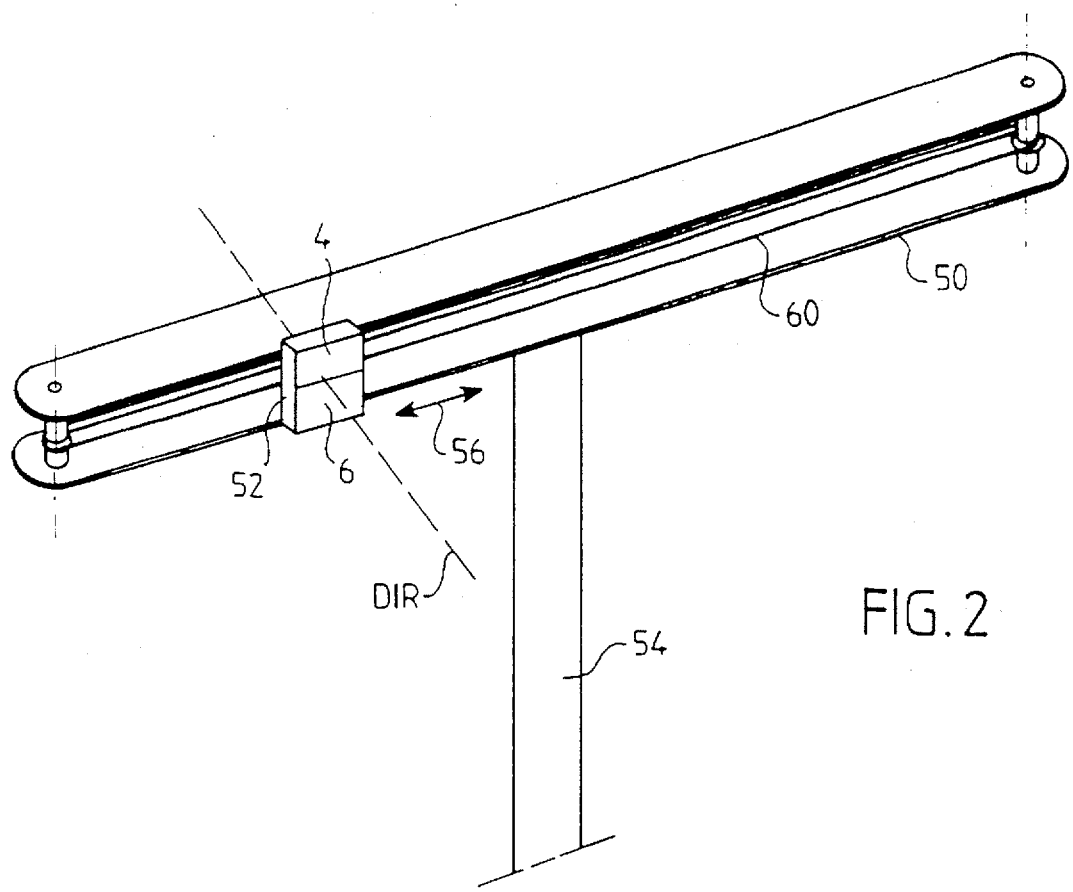
FIG. 2 is a schematic representation of a device in accordance with the invention, for the detection and location of objects on the ground, wherein the set constituted by the radar transmitter/receiver and the antenna is driven on a rectilinear guide rail in a closed circuit along a direction perpendicular to the direction of the radiating beam.

In FIG. 2, there has been represented a first embodiment of the means allowing the mode of displacement of the radar beam to be obtained.

This is a horizontal platform 50 which supports the assembly 52 constituted by the radar transmitter/receiver and the double antenna constituted by the transmitting antenna 4 and the receiving antenna 6, the two antennas 4 and 6 being joined and horizontally superposed on one another. The platform 50 is mounted round a mast 54 that is perpendicular to the ground and disposed in accordance with a predetermined geometrical relation relative to the zone ZD to be observed.

In practice, the platform is here fixed.

The operating wavelength is in this example of the order of 3 cm. The dimensions of the physical antenna are chosen so as to obtain the technical characteristics of the radar described above.

Suitable means displace the radar transmitter/receiver as well as the double antenna in a rectilinear horizontal translation relative to the mast 54, along a direction 56 that is perpendicular to the direction of incidence DIR of the radiating beam.

The assembly 52, constituted by the radar transmitter/receiver 52 and the double antenna, is mounted on a carriage (not shown). Driving means, such as a continuous motor or a stepper motor drive the carriage on a guide rail 60 having a rectilinear travel in a closed circuit.

For example, the rectilinear travel of the double antenna is of the order of 2 m to 2.20 m for the above mentioned application. The displacement speed of the assembly 52 is of the order of 2 m/s.

It should be observed that the platform can easily be placed near the zone to be observed.

Figures 3, 4:
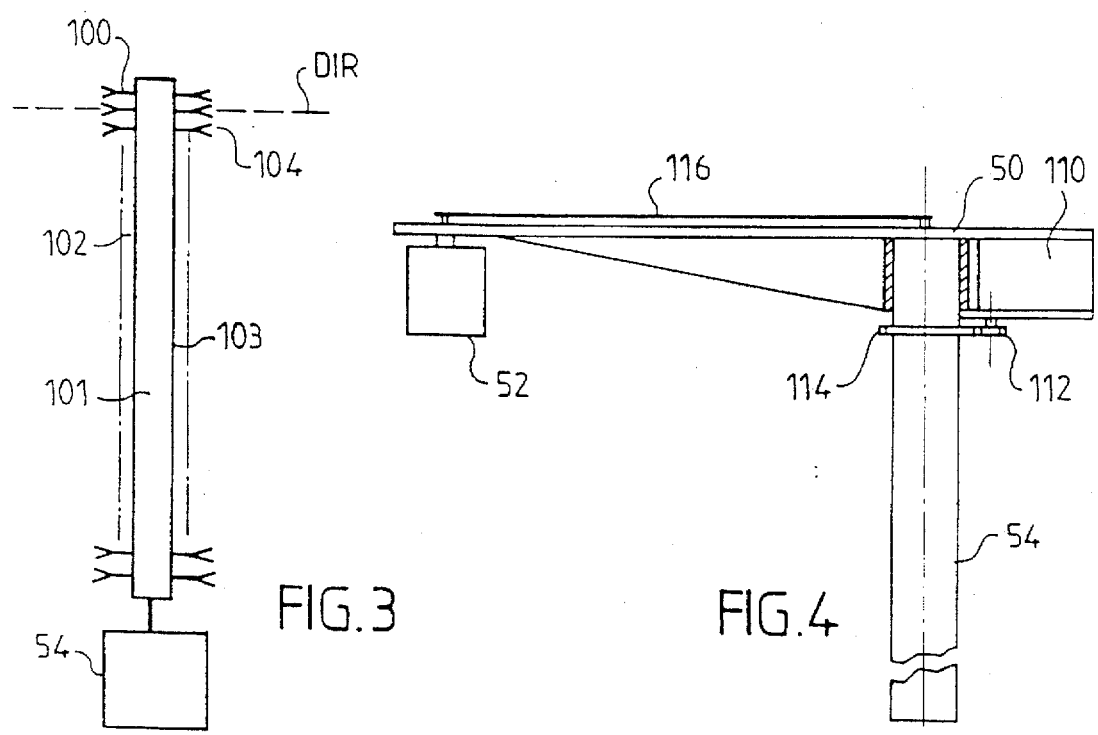
FIG. 3 is a top view of a device for the detection and location of objects on the ground, wherein the antenna is constituted by a small bar of radiating elements which can be respectively energized in such a way that the phase centre of the antenna is movable in linear translation relative to the mast, along a direction perpendicular to the direction of incidence of the radiating beam and at a speed chosen in accordance with the invention.
FIG. 4 is a schematic representation of the device for the detection and location of objects on the ground, wherein the angular compensation means control the displacement of the said set in such a way that the radiating beam generated by the antenna remains in translation along a direction perpendicular to the delimited zone during the rotation of the supporting platform.

In FIG. 3, there has been represented in a top view another embodiment of the means that allow for the mode of displacement of the radar beam to be obtained.

These means comprise a horizontal and fixed platform supporting the assembly constituted by the radar transmitter/receiver and the double antenna. As in FIG. 2, the platform is mounted on a mast.

The antenna 4 and the antenna 6 here comprise a plurality of radiating elements 100 arranged in at least one row disposed horizontally on the platform, the radiating elements being disposed for radiating along the direction DIR of the radar beam.

Advantageously, the plurality of radiating elements of one antenna 4 or 6, is arranged in two rows 102 and 104 for radiating in both directions along the direction of incidence DIR of the radar beam so as to observe two zones on either side of the radar.

In order to facilitate the understanding of the invention, in FIG. 3 there have been represented only two rows of radiating elements associated with the transmitting antenna 4. As regards the radiating elements (not shown) of the receiving antenna 6, they are arranged in at least one bottom or top row disposed horizontally below or above the row or rows of the radiating elements associated with the transmitting antenna.

Switching means 101, using diodes for example, switch the energization of the subgroups of radiating elements in such a way that the corresponding phase centre of the double antenna effects a movement in a linear horizontal translation relative to the mast, along a direction perpendicular to the direction of incidence DIR of the radiating beam. Suitable types of diode switching means will be known to the expert in the art.

For example, the energizing and switching of the radiating elements are effected sequentially per pair of adjacent elements.

Advantageously, the displacement speed of the phase centre of the antenna is adjusted according to the radial velocity of the object to be detected in relation to the radar.

For example, in the above mentioned application the displacement speed of the phase centre is of the order of 30 m/s. It should be observed that in this embodiment the analysis time is shorter than that described with reference to FIG. 2.

In FIG. 4, there has been represented another embodiment of the means allowing the radar beam to be displaced. Here the platform 50 is mounted for rotation round the mast 54.

An assembly constituted by a geared motor 110, a gear wheel 112 driven by the said motor 110, and a ring gear 114 disposed round the mast 54 and cooperating with the said gear wheel 112, allows the platform to be displaced round the mast at a chosen speed.

The angular speed is typically one rotation per 2 seconds.

Angular compensation means 116 control the displacement of the said radar set 52 during the rotation of the platform, in such a way that the radar beam is displaced parallel to itself and perpendicularly to the zone to be observed, and permanently irradiates the zone.

For example, the angular compensation means comprise a chain mechanism capable of driving the radar set 52 in translation in accordance with the rotation of the platform.

Mechanical means are provided to change the direction of the radar set 52 when it is disposed at the end of the track. These mechanical means may be driven by cams or a stepper motor.

Advantageously, the device in accordance with the invention is completed by at least two additional antennas (not shown) associated with and joined to the double antenna 4, 6, as well as Doppler-type radar processing means for measuring the speed of objects on the ground.

In practice, the diode switching means described with reference to FIG. 3 can be used for switching the radiating elements of the additional antennas.

The Doppler measurement can here serve to measure the speed of the moving vehicles, lane by lane etc.

Moreover, warning means (not shown) may be associated with the device according to the invention, for automatically alerting, for example, a distant control centre in response to a detection and location of substantially stationary vehicles in the zone being observed.

Although the fixed mast is considered to be far preferable, it is conceivable to replace it by a means remaining stationary relative to the ground with the desired accuracy, and sufficiently close to the ground.

The above description is focused on an application for the detection and location of substantially stationary motor vehicles in a delimited zone, such as a part of a highway. The device in accordance with the invention may quite obviously find other applications wherein the displacement of the beam is generated along a displacement parallel to itself over a path that is, in essence, transverse relative to its direction round a stationary position relative to the ground. Moreover, the threshold speed below which the objects are considered to be "substantially stationary" may depend on the application.

I claim:

1. A device for the detection and location of objects on the ground in a delimited zone, comprising:
   a) radar transmitter/receiver means provided with antenna means capable of generating a radiating beam displaceable parallel to itself over a path that is substantially transverse with respect to its direction around a stationary position relative to the ground;
   b) synthetic aperture radar processing means operative to process the output signal of said radar receiver means relating to the return of said beam over said delimited zone in accordance with the antenna movement, so as to detect and locate objects on the ground in said delimited zone;
   c) a horizontal platform capable of supporting said radar transmitter/receiver means and said antenna means; and
   d) a mast perpendicular to the ground and disposed in accordance with a predetermined geometrical relation relative to the delimited zone, said platform being fixedly mounted around said mast;
   wherein said antenna means has a phase center and comprises:
   a plurality of radiating elements arranged in at least one row disposed horizontally on the platform, said the radiating elements being disposed in subgroups so as to radiate along the direction of incidence of the radar beam; and
   switching means capable of switching the energization of each said subgroup of radiating elements in such a way that said phase center of the antenna means is movable in linear translation relative to said mast at a chosen speed along a direction which is perpendicular to the direction of incidence of the radar beam.

2. A device according to claim 1, wherein said antenna means is a double antenna and is constituted by a transmitting antenna and a receiving antenna, the two antennas being joined and one placed on top of the other.

3. A device according to claim 1, wherein said antenna means has a phase centre the speed of displacement of which is adjusted according to the radial velocity, relative to said device, of the object to be detected and located.

4. A device according to claim 1, and further comprising:
   at least two additional antennas joined at least in part to said antenna means, and
   Doppler radar processing means for measuring the speed of objects on the ground.

5. A device according to claim 1, and further comprising warning means, and actuating means capable of actuating said warning means in response to detection and location of objects on the ground.

6. A device according to claim 1, including displacement means operative to displace the radar transmitter/receiver means as well as the antenna means in a rectilinear horizontal translation relative to the mast and at a chosen speed along a direction perpendicular to the direction of incidence of the radar beam.

7. A device according to claim 1, further including carriage means whereon there is mounted said radar transmitter/receiver and said antenna means; wherein said displacement means comprise a guide rail having a rectilinear travel in a closed circuit, and drive means capable of driving the carriage on said guide rail.

8. A device according to claim 7, wherein the rectilinear travel of the antenna is of the order of 2 m to 2.20 m.

9. A device according to claim 1, and further including:

displacement means operative to displace said platform around said mast at a chosen speed, and angular compensation means operative to control the displacement of said radar transmitter/receiver means and said antenna means in such a way that the radiating beam generated by the antenna means is displaced parallel to itself, and perpendicularly to the delimited zone, during the rotation of said platform.

10. A device according to claim 1, wherein the resolution of the radar is 2 m, with a range of 300 m.

11. A device according to claim 1, wherein the operating wavelength of said radar transmitter/receiver means is of the order of 3 cm.

12. A device according to claim 1, further including:

storage means capable of storing a representation of the delimited zone, and processing means capable of comparing the thus stored representation with the representation of the zone coming from said synthetic aperture processing means, for detecting and locating objects on the ground.

* * * * *